United States Patent [19]
Joyce et al.

[11] Patent Number: 4,528,759
[45] Date of Patent: Jul. 16, 1985

[54] GOLF BALL GAUGE

[75] Inventors: Richard E. Joyce, Rocky River; Allen E. Joyce, Mentor, both of Ohio

[73] Assignee: Gordon Warren Co., Wickliffe, Ohio

[21] Appl. No.: 514,925

[22] Filed: Jul. 18, 1983

[51] Int. Cl.³ .............................................. G01B 3/34
[52] U.S. Cl. .................................... 33/178 B; 33/508
[58] Field of Search ............ 33/178 B, 174 F, 178 R, 33/174 Q

[56] References Cited

U.S. PATENT DOCUMENTS

| | | | |
|---|---|---|---|
| 2,402,142 | 6/1946 | Anderer et al. | 33/178 B |
| 2,580,412 | 1/1952 | Darmody | 33/178 B |
| 2,859,530 | 11/1958 | Renaud | 33/174 H |
| 3,665,757 | 5/1972 | Hoag | 33/178 B |
| 3,797,123 | 3/1974 | Fraley | 33/178 B |
| 3,828,442 | 8/1974 | Bernard | 33/178 B |
| 4,385,447 | 5/1983 | Bennett | 33/174 F |

*Primary Examiner*—William D. Martin, Jr.
*Attorney, Agent, or Firm*—Frank B. Robb

[57] ABSTRACT

A gauge for spherical objects which includes a cylindrical tubular body having an interior passageway to receive an object for random movement, the passageway being of precisely developed configuration, which is maintained because the material forming the body has a very low coefficient of expansion since it is a mixture of catalyzed polyester resin and silicon carbide grit or comprised of equivalent materials having like characteristics.

10 Claims, 10 Drawing Figures

GOLF BALL GAUGE

BACKGROUND AND DESCRIPTION OF THE INVENTION

The present invention relates to a gauge which is provided to determine the sphericity of a spherical object, this spherical object, by way of example, in this particular instance being a golf ball of generally conventional form and thus well known.

The basic premise upon which this concept is built, is to determine within very close limits whether or not a golf ball of the usual exterior appearance and cover is in fact a sphere or so nearly spherical as to be considered such and certainly this is more closely determinable by the device hereof than has heretofore been the case.

The usual gauges for spherical objects may consist of a ring-like band through which the spherical object can be passed, but that only determines in many cases whether this object is spherical at the particular circumfirential location and diameter which is chosen by random act, through which the object will pass in this spherical gauge device.

Another problem which arises with many gauges is the fact that they are very responsive to changes in the temperature and must be used in temperature controlled conditions, something which is obviously not important but also not usually available in golf ball gauging though it may be in manufacture of golf balls.

However it is desirable of course to provide a gauge which will determine the sphericity of a golf ball for example, which gauge is not subject to very much distortion or variation irrespective of the weather. While the weather is usually reasonably warm and fairly uniform when a gauge of this kind is to be used, large variations in an ordinary gauge under substantial temperature differences is still possible but in this gauge does not take place.

However it is still a very desirable attribute of a gauge of any kind to be relatively unaffected by minute changes or even substantial changes in temperature and the atmosphere generally.

With the foregoing in mind it is a primary object of this invention to provide a gauge which will in fact determine sphericity of a golf ball by reason of the fact that the gauge is of a conformation which will enable the golf ball to be placed therewithin and by suitable manipulation pass the golf ball in such a path as will bring the various surfaces thereon or various parts of the surface thereon into position for either contact with the gauge wall or not, but if not spherical then certainly to be ascertained by interference with such gauge wall.

The invention specifically contemplates the use of a suitable filler material, in this instance a silicon carbide grain grit which is formed by centrifugal molding into a hard cylindrical tubular body with a binder such as polyester resin, catalyzed, the respective proportions being such as to provide an inner surface of resin alone, which can be machined to precise dimensions.

The body thus comprises a gauge which retains its size and shape under widely varying temperatures and moisture conditions.

Further the inner surface may be machined to provide two gauging surfaces, one to determine maximum allowable size of object as well as sphericity, the other surface to ascertain that the object does not fall below a predetermined minimum diameter.

The other surface referred to provides for gauging the minimum diameter.

It is a further object of the invention and a very important aspect, to provide a gauge of the general class hereinbefore suggested which is comprised of a novel material, which is substantially unaffected by atmospheric and temperature conditions.

In summary the invention involves not only a novel gauge, but in addition is formed in an unique way although availing of some known techniques, whereby the ultimate article is not only used in a different way from other gauges but is itself differently constructed from prior gauges.

With that general explanation in mind, specific objects and advantages of the invention will be understood from a consideration of the specification appended hereto and disclosed in the drawing wherein.

Figure 6:
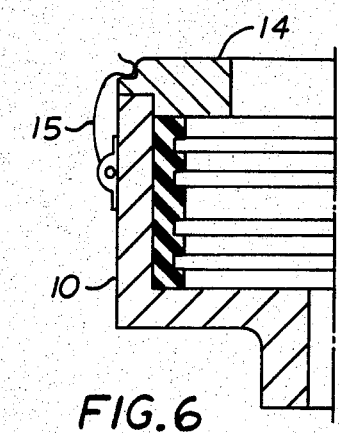
Figure 7:
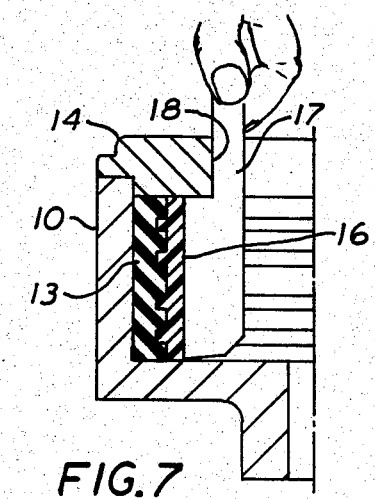
Figure 8:
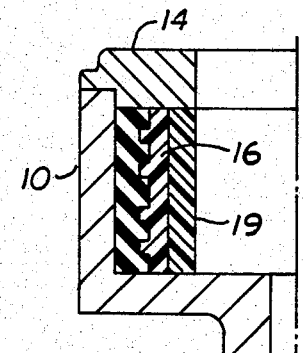

FIGS. 6, 7 and 8, fragmentary sectional views of the mold and certain steps in the making of the gauge body.

Figure 9:
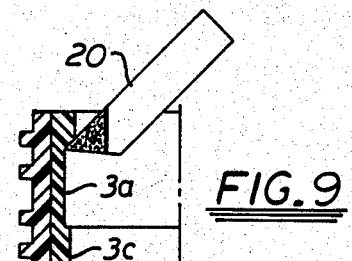

FIG. 9 shows a fragment of part as it is machined in finishing.

Figure 10:
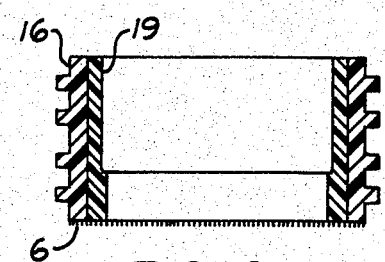

FIG. 10 is a vertical cross-sectional view of a finished gauge body.

Figure 1:
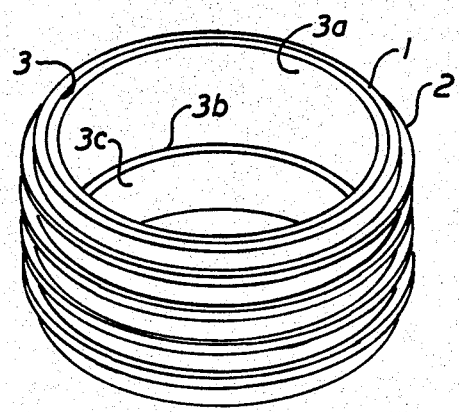
FIG. 1 is a perspective view of the gauge of this invention.
Figure 2:
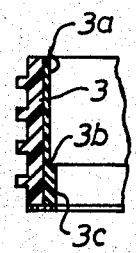
FIG. 2 is a fragmentary sectional view through the gauge wall.
Figure 3:
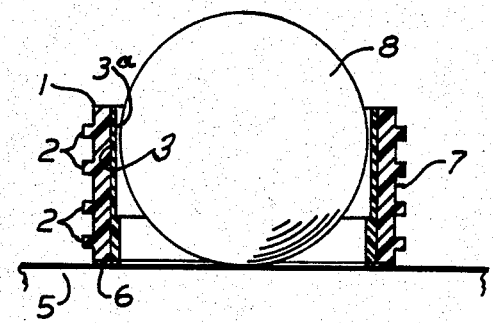
FIG. 3 is a sectional view of the gauge with a spherical object positioned therein in this instance a golf ball.
Figure 4:
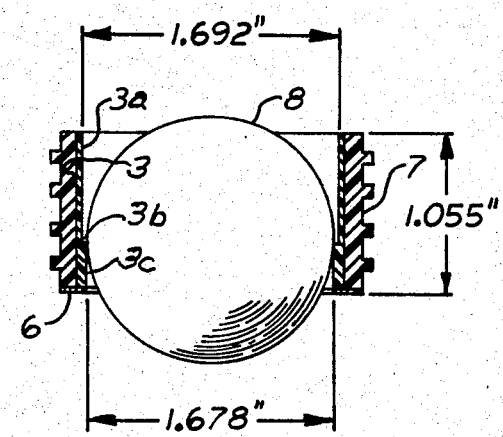
FIG. 4 is a cross-sectional view showing the gauge in the position to determine whether or not the ball is of suitable minimum size.

Referring now to FIG. 1, the gauge hereof is shown as being comprised of a cylindrical tubular body designated 1, which is of a length or in this instance more specifically a height as suggested by FIG. 3 of approximately one inch and of a diameter on the order of 2 3/16 inches maximum, the foregoing dimensions being given purely for the sake of providing a rough idea of the size of the object with which we are dealing at this point.

The body 1 being cylindrical and tubular as stated, is of reasonably thick wall configuration having extending outwardly therefrom at its periphery the several exteriorly positioned spaced, circumferentially arranged ribs which are designated 2.

The body of the gauge 1, is formed of a silicon carbide grit grain which is described as 60-80 grit, and in turn bonded into an integral part by the use of a polyester resin which is catalyzed by methylethylketone peroxide, of known formulation.

However it should be observed that this body comprising the grit which is mixed with the resin and thus becomes an integral member, is formed in a way and by a method to be subsequently described in detail.

Suffice to say at this point that the body 1 is as previously mentioned with an indicated interior wall designated 3, also cylindrical, but because of the method of forming a further surface of polyester resin to be machined is also provided.

The proportions of resin to grit and the centrifugal molding resorted to result in a layer of resin, which is machined after hardening providing an upper cylindrical surface 3a extending downwardly to a shoulder 3b, with a further cylindrical surface or wall 3c also being machined to precise dimension.

There are thus provided two surfaces, which can be used as gauging surfaces in a manner to be set forth.

The lowermost end of the body 1 is furnished with a flocking or similar material adhered thereto in any preferred manner, so that the entire gauge body can rest upon and not scratch or deface a suitable planar surface which is designated 5 as suggested in FIG. 3.

This is arranged in this manner so as to enable the manipulation of the gauge with a spherical object such as a golf ball designated 8 in place as shown in FIG. 3, in such a manner as to cause the spherical object to rotate and revolve within the gauge whereby if it is not of the preferred dimension it will either stick or not fit in the gauge at all or fit too loosely therewithin.

The manipulation of the gauge as before suggested so as to move the same in contact with the surface with the spherical object 8 interior thereof, will provide an indication of maximum size spherical object and the sphericity will be determined by the ability of the object to move freely without sticking or otherwise hanging up in position.

Since it is necessary to determine whether the object is just too small to be properly gauged, or whether it is of proper size, the surface 3c is arranged so as to be of the minimum diameter desired in the object.

Since we are dealing with golf balls in this particular example, it is notable that the maximum diameter of a golf ball with the tolerances is 1.692 the ball being nominally 1.690 inches and the minimum diameter of the golf ball being of 1.678 with the nominal dimension being 1.680 inches.

The nominal dimension is in accordance with the Professional Golfing Association regulations and it will be understood that there are other possible desired sizes of golf balls such as those in the British metric system which could be gauged if the gauge in turn is properly proportioned with relation thereto.

With the use and general configuration of the gauge having been explained, it is notable that the composition thereof is of very material importance and one which is not normally used for gauge bodies as far as we are aware and has never been used therefore, since it is a really hard substance, being the silicon carbide grain grit which is integrated by the use of the polyester resin catalyzed as before mentioned.

It might be noted at this point that any suitable materials which will be of hard ultimate composition and inert as well as having very low coefficient of expansion could be used in similar dimensional setup for the purposes of gauging a golf ball along the lines heretofore suggested.

In this particular instance noted, the proportions of polyester resin to grit are approximately 15 cc of grit and 16 cc of resin, in this instance the proprietary polyester resin known as Polylite 33-072, is mixed with the catalyst 46-700 both of which are Reichhold Chemical Co. items or their equivalent of course.

Since it is important to form the gauge along the lines of one which will have a relatively softer surface than the grit itself would provide, the method of such formation is next described in relationship to the FIGS. 5 to 10 inclusive.

Figure 5:
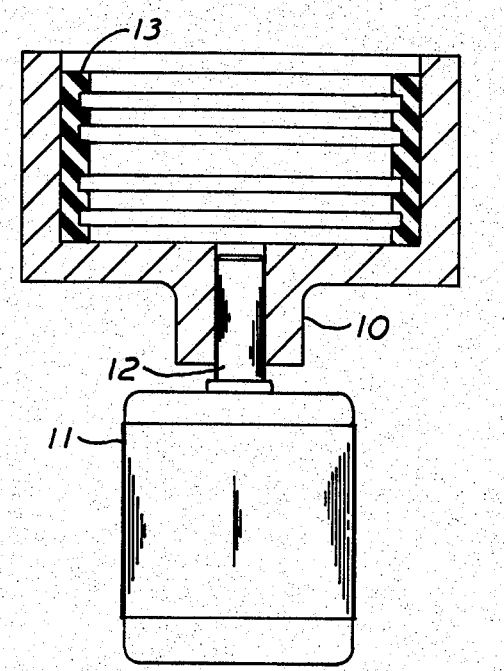
FIG. 5 is a somewhat diagrammatic view, showing a mold, with insert as positioned for rotation.

In these figures, and particularly FIG. 5 initially, a mold of suitable form usually aluminum is provided and designated 10 having a suitable cavity therewithin, the mold as such being susceptible of mounting for rotation by a motor such as 11 on a shaft 12 thereof.

The mold 10 is arranged so as to have a silicon rubber insert 13 positioned therewithin, such insert having the female cavity which will produce the ultimate exterior configuration of the object to be molded therein in this case of course the body 1.

A suitable lid such as 14 is then placed on the mold and secured by fasteners such as 15, all the foregoing being somewhat conventional practice.

Turning to FIG. 7, it will be seen that the mold 10, is being rotated and has had deposited therewithin the silicon carbide grain grit which is designated 16 at this point for purposes of description, and during the rotation a suitable leveling tool such as 17 is availed of, inserted within the mold and guided by the opening 18 in the lid 14 previously mentioned will thereby level out the grain 16 therewithin.

Subsequently the polyester resin previously mentioned is poured into the mold while the same is being rotated and thereby availing of centrifugal force to penetrate the grain grit and thereby form an integral body thereof.

Since the quantity of resin poured in is calculated to be more than is required for actual consolidation of the grit 16, the resin being designated 19 for purposes of description, it will thereby provide a wall or area of some desired thickness which does not have any grain or grit therein.

As will be suggested by FIG. 9, suitable manipulation of a tool such as 20 may be resorted to to form the inner wall or face 3a previously mentioned with the lower inner wall 3c likewise having been machined thereon, or in the process of being machined and finished as will be understood.

FIG. 10 discloses in section the ultimate product with the respective areas of polyester resin now of course catalyzed and thus necessarily hard as well as the catalyzed and hardened grain grit area of the gauge body designated 16 as previously mentioned.

It will be apparent that the parts have been removed from the silicon rubber mold by manipulation and already have sprayed on the lower edge of the body the flocking suggested at 6 and previously mentioned.

With the product thus formed the gauging operation may be performed as previously stated.

It should be understood further that while the specific method and article formed are of the proportions and elements suggested, it is entirely within the concept hereof that other materials of suitable nature which are fillers or can be machined and/or otherwise configured to ultimately the dimensions desired for a gauging article of this form or comparable form to provide the necessary indication of suitable sizes desired, can be used.

It is to be understood that where the gauging dimensions are to be different other machining operations may be resorted to to form the inner wall or surfaces which would be used for gauging purposes.

It is again emphasized that the method of making this gauge body is important as well as the ultimate product obtained thereby and thus the detailed explanation provided is thought helpful in considering and in understanding the invention as well as providing a basis for the claims appended hereto.

It is probably desirable to note that a curing operation of the parts will preferably be effected to harden the same and stabilize them, comprising heating for a period of four to eight days in an oven which is operated at about 150 degrees F. after which they are machined.

We claim:

1. A gauge to determine the sphericity of a spherical object, comprising a rigid, unitary body having a cylindrical opening of the maximum diameter acceptable for the object, one end of said opening comprising the lower end lying in a plane perpendicular to the axis of the opening, said opening further being of a length greater than the radius of such object, movement of the said one end along and about in contact with a planar surface whilst such object is in place in the opening in contact with the surface and moving about with a portion of the spherical surface maintaining contact with the surface if the object is in fact spherical, enabling determination that such object is not spherically greater than desired if the object continues to move freely during movement of the body as stated.

2. A gauge as claimed in claim 1, wherein the lower most portion of the lower end of the opening is provided with a short vertically extending cylindrical surface of the minimum diameter acceptable for the object, whereby raising the body from the surface with the object being retained within the opening by the short surface provides indication of acceptable minimum size of the spherical object.

3. A gauge as claimed in claim 1, wherein the minimum acceptable diameter of the object is determined by a shoulder formed near the lower end of the cylindrical surface which is of a diameter to prevent the object from passing therethrough when the body is raised from such planar surface.

4. An article of manufacture comprising a gauge to determine the sphericity of a spherical object, which gauge is formed of polyester resin reinforced with silicon carbide grit molded into a body having a cylindrical passageway therein, in which the object may be rotated in random manner, said body having a lower end for contact with a planar surface which supports such object for gauging.

5. An article as claimed in claim 4, wherein the polyester resin is catalyzed, mixed with the carbide grit and molded in a rotating mold to distribute the resin through the grit.

6. An article as claimed in claim 4, wherein the body is formed by centrifugal casting of substantially equal parts of catalyzed polyester resin and silicon carbide grit.

7. An article as claimed in claim 6, wherein 16 cc. of polyester resin is catalyzed with 5 percent MEK peroxide and mixed with 15 cc. of 60/80 grit silicon carbide grain, and centrifugally rotated until formed for subsequent handling.

8. An article as claimed in claim 4, wherein the body is substantially tubular and provided with a series of exteriorly positioned, spaced, circumferentially arranged ribs.

9. An article as claimed in claim 4, wherein the cylindrical passageway is precisely formed to the maximum diameter permitted for the objects to be gauged, and to be positioned in said passageway.

10. An article as claimed in claim 4 wherein a smaller cylindrical passageway is formed to the minimum diameter permitted for the objects to be gauged to determine the minimum diameter of such objects.

* * * * *